United States Patent
Bruhn

(10) Patent No.: US 11,807,506 B1
(45) Date of Patent: Nov. 7, 2023

(54) TOOLBOX LIFT

(71) Applicant: Kenneth Bruhn, Nocona, TX (US)

(72) Inventor: Kenneth Bruhn, Nocona, TX (US)

( * ) Notice: Subject to any disclaimer, the term of this patent is extended or adjusted under 35 U.S.C. 154(b) by 176 days.

(21) Appl. No.: 17/381,038

(22) Filed: Jul. 20, 2021

Related U.S. Application Data

(60) Provisional application No. 63/053,810, filed on Jul. 20, 2020.

(51) Int. Cl.
*B66F 3/28* (2006.01)
*B66F 11/00* (2006.01)
*B60R 11/06* (2006.01)

(52) U.S. Cl.
CPC ............... *B66F 3/28* (2013.01); *B60R 11/06* (2013.01); *B66F 11/00* (2013.01); *B66F 2700/052* (2013.01); *B66F 2700/055* (2013.01)

(58) Field of Classification Search
CPC ...... B66F 3/28; B66F 11/00; B66F 2700/052; B66F 2700/055
See application file for complete search history.

(56) References Cited

U.S. PATENT DOCUMENTS

| | | | | |
|---|---|---|---|---|
| 2,309,123 A * | 1/1943 | Kiesling | ............... | B66B 7/022 187/406 |
| 2,740,607 A * | 4/1956 | Branick | ............... | B66F 7/04 254/93 H |
| 5,911,408 A * | 6/1999 | Berends | ............... | B66F 7/04 280/43.23 |
| 6,102,474 A * | 8/2000 | Daley | ............... | B60R 11/06 296/76 |
| 6,588,720 B1 * | 7/2003 | Revette | ............... | B60N 3/102 224/403 |
| 8,393,665 B2 * | 3/2013 | Villano | ............... | B60R 9/065 224/543 |
| 9,481,403 B1 * | 11/2016 | Johnson | ............... | B62D 33/023 |
| 9,862,333 B1 * | 1/2018 | Jones | ............... | B60R 9/065 |
| 2016/0038240 A1 * | 2/2016 | Guerrero | ............... | B66F 3/00 254/133 R |
| 2019/0039532 A1 * | 2/2019 | Peter | ............... | B60R 3/02 |

* cited by examiner

*Primary Examiner* — Seahee Hong
(74) *Attorney, Agent, or Firm* — Kenneth L. Tolar

(57) ABSTRACT

A lift for relocating a toolbox includes a base plate attached to a truck bed having a lifting mechanism mounted thereon. The lifting mechanism is attached to a rectangular support frame that is dimensioned and configured to cradle and grip the bottom wall of a given toolbox. When actuated, the lifting mechanism rotates within a ninety-degree range to move the toolbox from a lowered position, adjacent and parallel to the truck cab, to a raised position, adjacent and parallel to the bed sidewall.

6 Claims, 7 Drawing Sheets

TOOLBOX LIFT

CROSS REFERENCE TO RELATED APPLICATIONS

This application claims priority of provisional application No. 63/053,810 filed on Jul. 20, 2020, the specification of which is incorporated herein by reference.

BACKGROUND OF THE INVENTION

The present invention relates to a device that automatically lifts and moves a truck-bed toolbox to a more accessible location.

DESCRIPTION OF THE PRIOR ART

Mounting a toolbox in a truck bed allows a worker to conveniently transport a myriad of tools to and from a jobsite. Typically, the toolbox is mounted against the rear wall of the truck cab to maximize storage space within the cargo compartment. To access a tool, a worker must reach over one of the truck bed sidewalls or climb into the bed, which is burdensome, time consuming and inconvenient. If multiple tools are required, the worker may have to repeatedly climb into the truck bed, which is particularly exhausting and significantly increases the risk of injury.

Temporarily repositioning the toolbox adjacent a sidewall eliminates the need to climb into the truck bed. However, relocating the toolbox requires the worker to enter the truck bed at least once to move the toolbox and again when returning it to a storage location. Furthermore, because truck-bed toolboxes can weigh from 200 to 700 pounds, moving them is difficult if not impossible for older or physically limited workers and can injure a worker's back regardless of physical condition.

Accordingly, there is currently a need for a device that eliminates the burdensome task of accessing a truck-bed toolbox. The present invention addresses this need by providing a lift that conveniently relocates a toolbox near a truck bed sidewall to facilitate access.

SUMMARY OF THE INVENTION

The present invention relates to a lift for relocating a toolbox comprising a base plate attached to a truck bed having a lifting mechanism mounted thereon. The lifting mechanism is attached to a rectangular support frame that is dimensioned and configured to cradle and grip the bottom wall of the toolbox. When actuated, the lifting mechanism rotates within a ninety-degree range to move a toolbox from a lowered position, adjacent and parallel to the truck cab, to a raised position, adjacent and parallel to the bed sidewall.

It is therefore an object of the present invention to provide a lift for conveniently relocating a truck-bed toolbox.

It is therefore another object of the present invention to provide a toolbox lift that raises and rotates a toolbox to face a side of a truck bed.

It is yet another object of the present invention to provide a toolbox lift that eliminates the strenuous and burdensome practice of repeatedly climbing into a truck bed to access tools.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
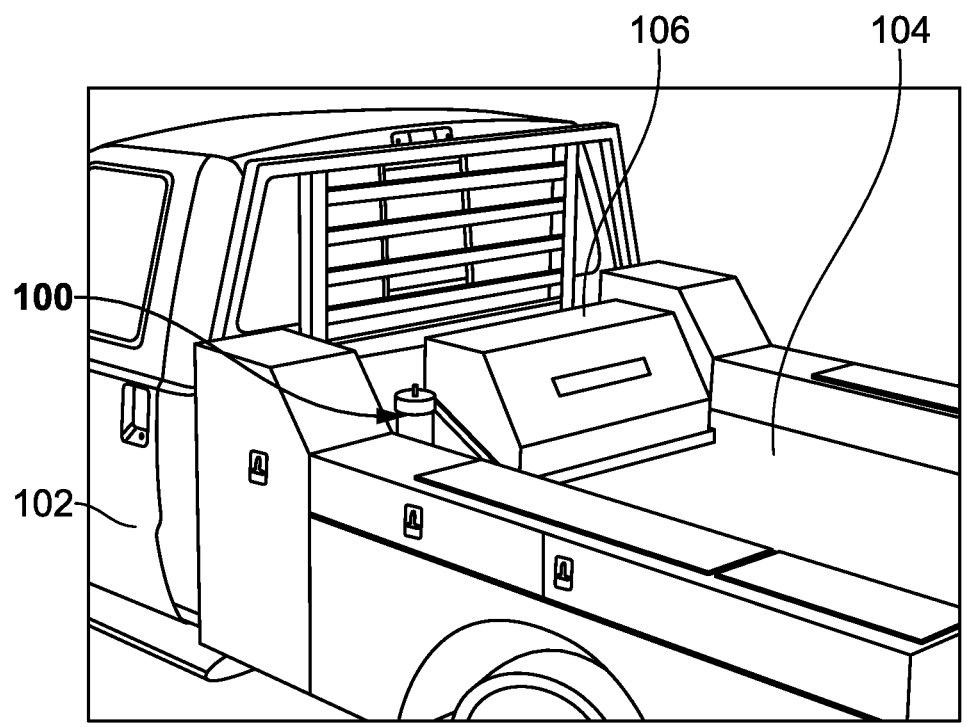
FIG. 1 is a perspective view of a pickup truck with the lift according to the present invention mounted beneath a toolbox.
Figure 2:
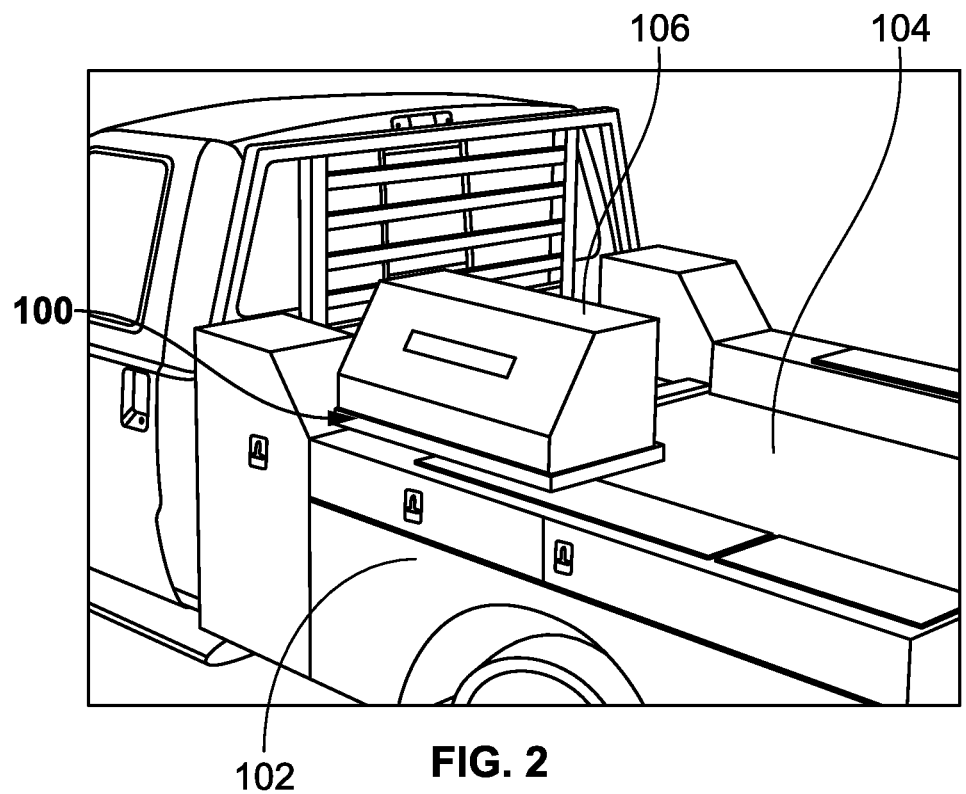
FIG. 2 depicts the toolbox moved to a side of the truck bed.
Figure 3:
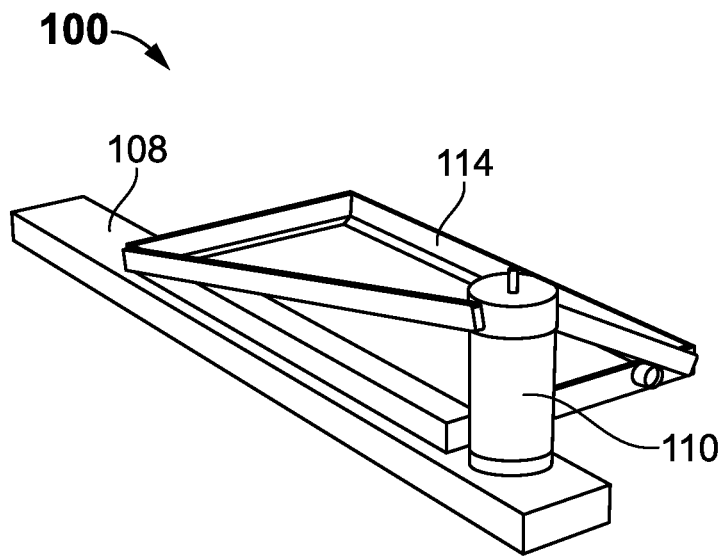
FIG. 3 is an isolated, perspective view of the lift in a lowered orientation.
Figure 4:
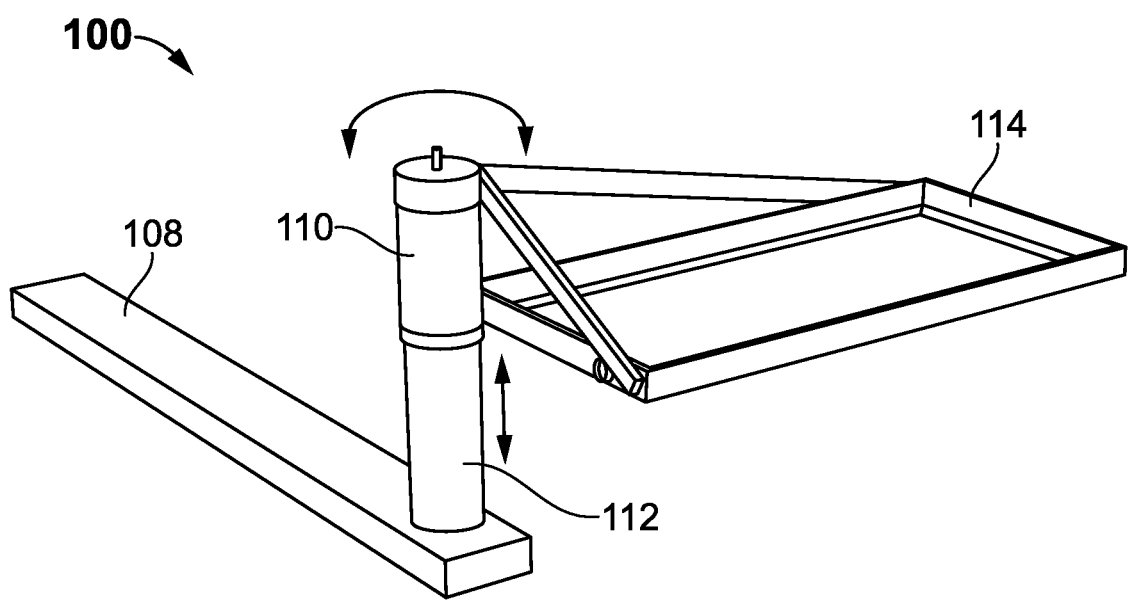
FIG. 4 is an isolated, perspective view of the lift in a raised orientation.
Figure 5:
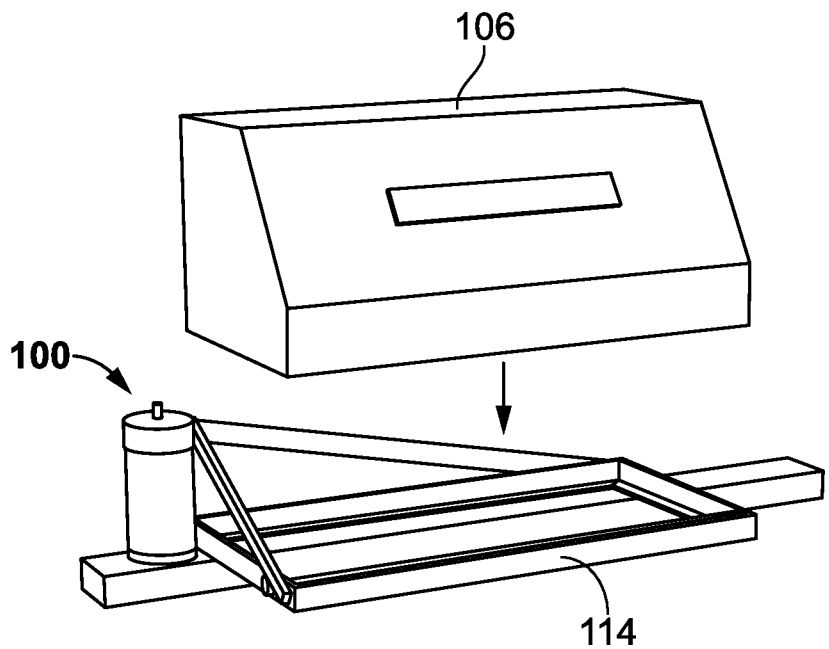
FIG. 5 is an exploded view of the lift and toolbox.
Figure 6:
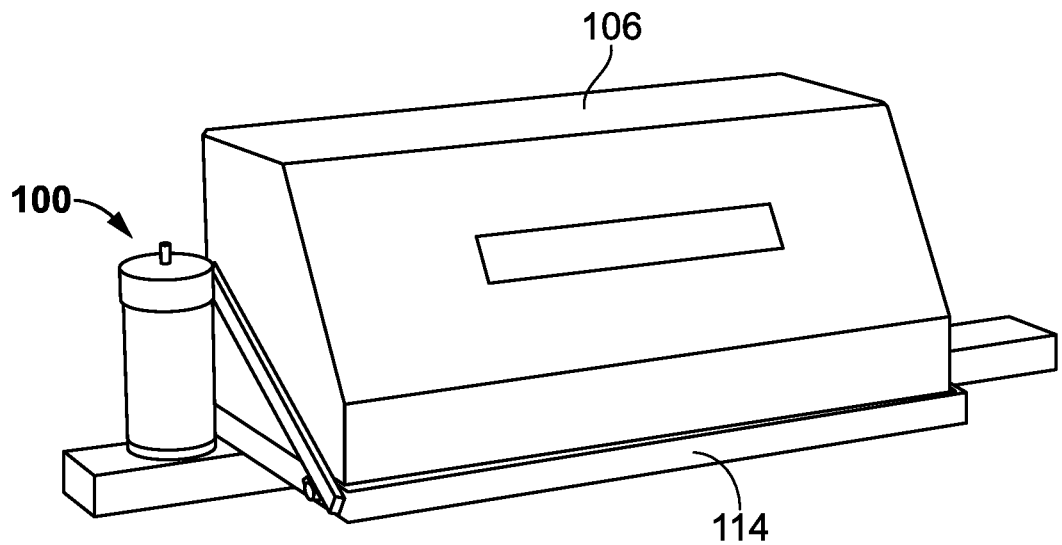
FIG. 6 is an isolated, front view of the lift and toolbox.
Figure 7:
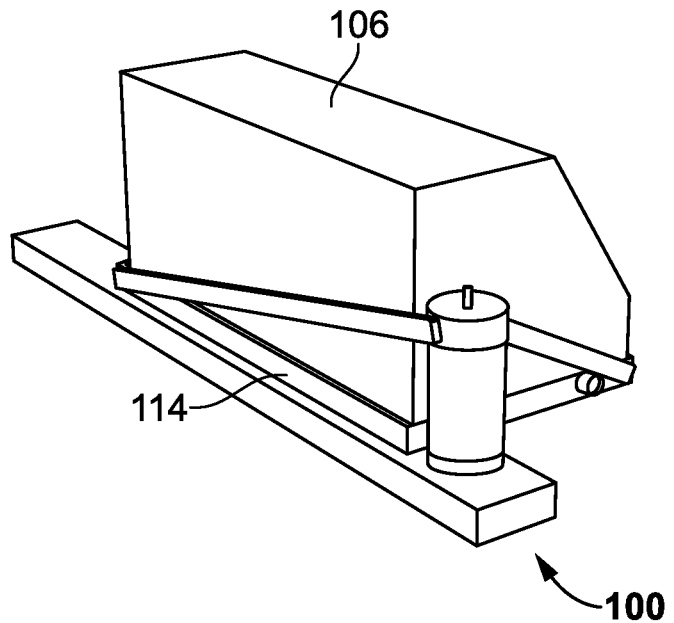
FIG. 7 is an isolated, rear view of the lift and toolbox.
Figure 8:
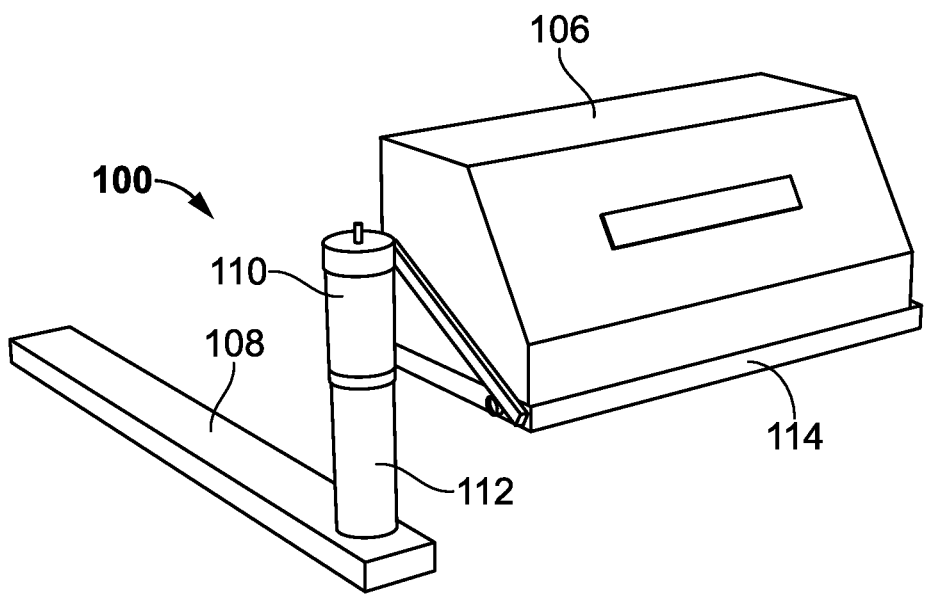
FIG. 8 is an isolated, perspective view of the lift and toolbox in a raised orientation.
Figure 9:
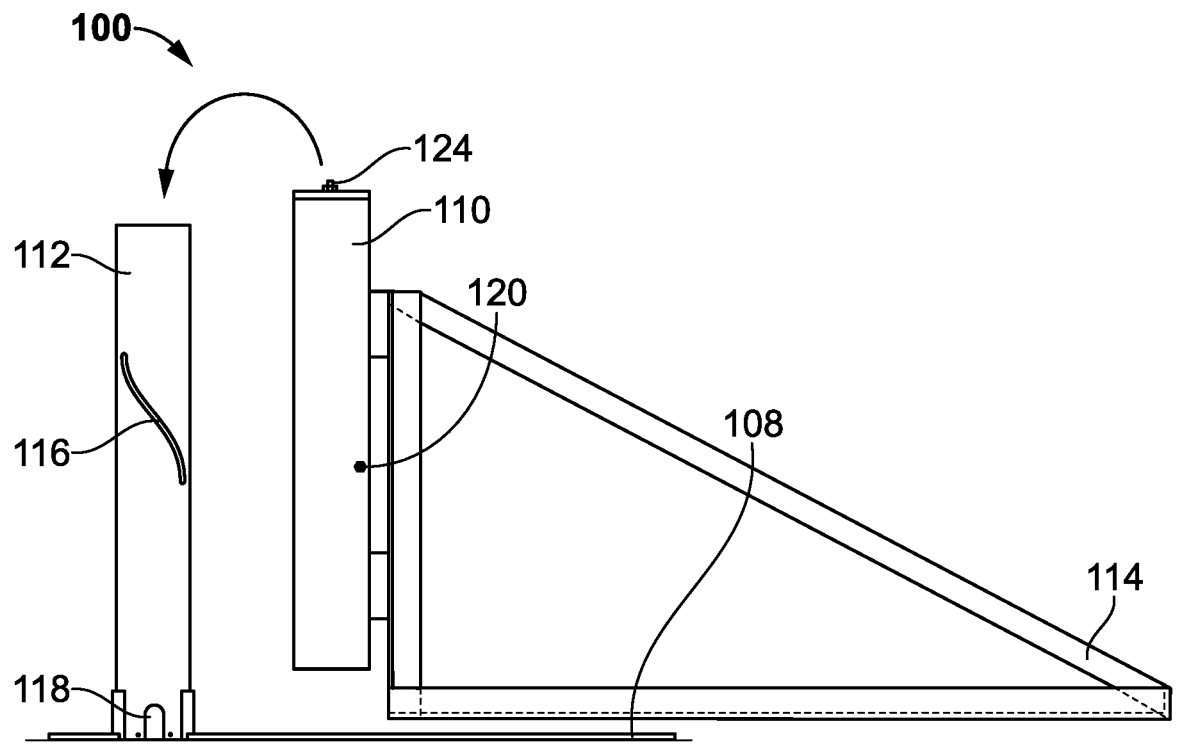
FIG. 9 is a side view of the lift.
Figure 10:
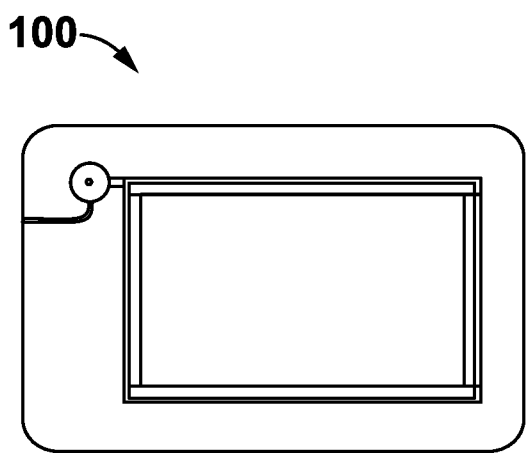
FIG. 10 is a top view of the lift.
Figure 11:
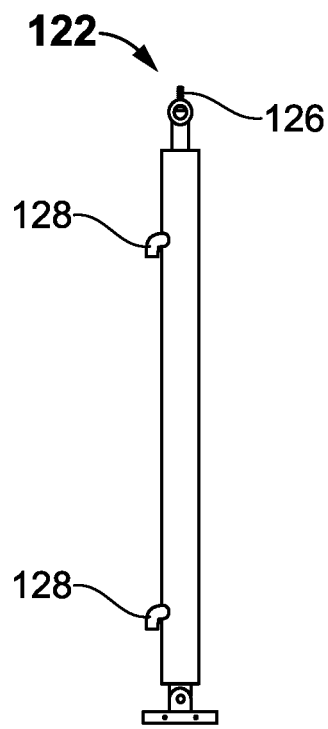
FIG. 11 is an isolated view of the hydraulic cylinder.

The present invention relates to a lift 100 for relocating a toolbox 106 positioned within the bed 104 of a pickup truck 102. As depicted in the drawings, the toolbox 106 could be triangular though the device can be configured to lift and relocate any other type of toolbox. The lift comprises a base plate 108 attached to the truck bed, beneath or adjacent the toolbox 106. On the upper surface of the base plate 108 is a lifting mechanism including an outer tube 110 having a rectangular support frame 114 attached thereto. The support frame 114 is dimensioned and configured to cradle and grip the bottom wall of a given toolbox. The outer tube 110 telescopically receives an inner tube 112 having a hydraulic cylinder 122 positioned therein. The interface between the inner and outer tubes may include an interposed layer of grease or a similar lubricant to minimize friction. The hydraulic cylinder 122 includes a bolt or similar fastener 126 at an upper distal end that is passed through a hole 124 at the upper end of the outer tube 110 and is tightened. Therefore, extension and retraction of the cylinder 122 expands and collapses the tubes 110, 112.

The inner tube 112 includes a pair of diametrically opposed slots 116 that each traverse a substantially vertical, circumferential path within an approximately ninety-degree range. Within the interior of the outer tube are a pair of guide rollers 120 that ride within the slots 116 so that as the outer cylinder rises and lowers, it rotates the frame within the ninety-degree range. The inner tube also includes an opening 118 near a lower end for receiving hydraulic hoses 128 from a pump 134 to prevent twisting and binding.

Figure 12:
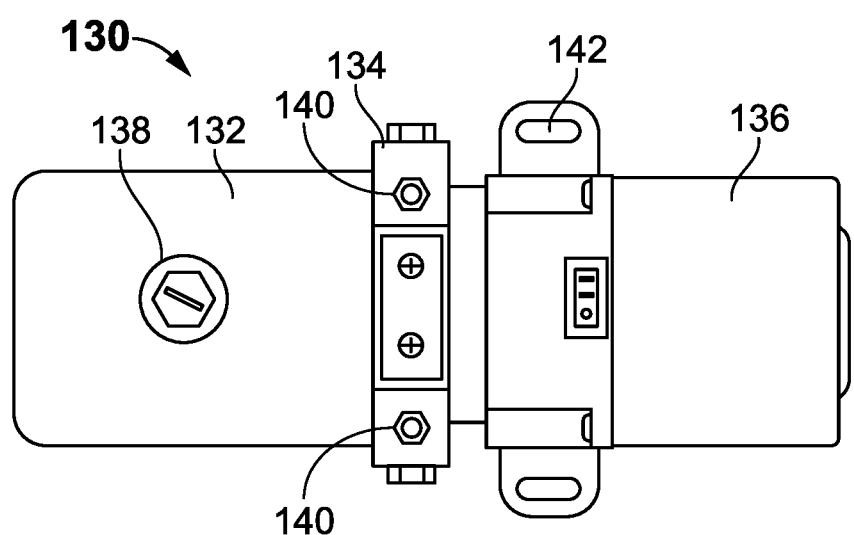
FIG. 12 is an isolated, plan view of the hydraulic motor.
Figure 13:
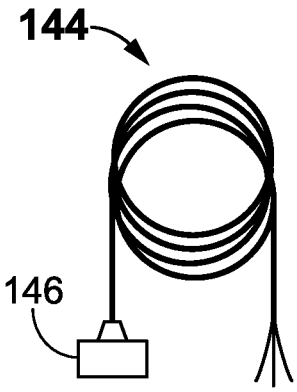
FIG. 13 is an isolated view of the power cable.
Figure 14A:
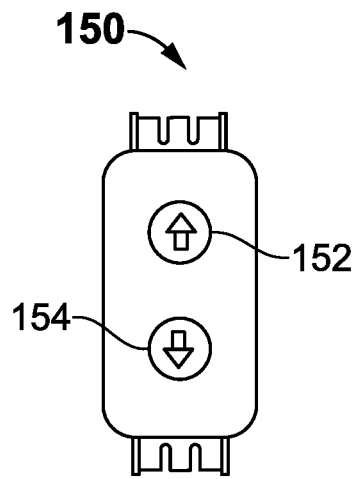
FIG. 14A is an isolated front view of the switch.
Figure 14B:
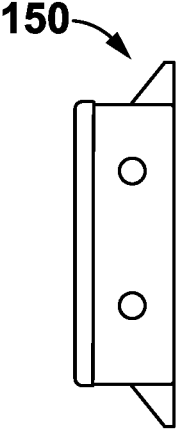
FIG. 14B is an isolated side view of the switch.

Referring specifically to FIG. 12, the hydraulic cylinder is operated by a hydraulic motor assembly 130 including a reservoir 132, a fluid pump 134 and a reversible DC electric motor 136. Preferably, the pump 134 is of the type typically used as a tilt/trim pump on a boat to withstand virtually any type of weather. The motor assembly 130 further includes a bracket 142 with fasteners 140 that allow the motor 130 to be conveniently mounted near the lift. The pump motor 136 is powered by cables 144 with polarized connectors 146 connected to the vehicle's battery 162. A removable port 138 in communication with the reservoir allows the hydraulic system to be replenished with fluid.

A control switch 150 powers the reversible motor and pump to expand and contract the cylinder. An UP 152 button causes the pump and motor to deliver pressurized fluid to the cylinder while a DOWN 154 button withdraws the pressurized fluid. The switch is preferably mounted in a location that is easily accessible by a user standing near the truck bed.

As is readily apparent from the detailed description above, the present invention provides a lift that moves a toolbox from a lowered position adjacent and parallel to the truck cab to a raised position parallel to the bed sidewall. Accordingly, a worker does not have to climb into the truck bed to access tools or move the toolbox.

The above-described device is not limited to the exact details of construction and enumeration of parts provided herein. Furthermore, the size, shape, and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A toolbox lift comprising:
   a support frame attached to a toolbox within a truck bed;
   means for moving said support frame between a lowered position, perpendicular to a truck bed sidewall, and a raised position, parallel to a truck bed sidewall.

2. The toolbox lift according to claim 1 wherein said means for moving said support frame between the lowered position, perpendicular to the truck bed sidewall, and the raised position, parallel to the truck bed sidewall comprises:
   an outer tube attached to said support frame, said outer tube having at least one guide roller on an inner surface;
   an inner tube telescopically received within said outer tube, said inner tube having at least one slot that traverses a substantially vertical, circumferential path within a predetermined range, said guide roller riding within said slot;
   a hydraulic cylinder received within said inner tube and attached to said outer tube, whereby when said hydraulic cylinder is extended or retracted, the guide roller rides within said slot causing said outer tube and said frame to change elevation and rotate.

3. The toolbox lift according to claim 2 wherein the hydraulic cylinder is operated by a hydraulic motor assembly, a fluid pump and a reversible motor.

4. A toolbox lift comprising:
   a base plate mounted within a truck bed;
   a support frame attached to a toolbox positioned within said truck bed;
   a lifting mechanism mounted on said base plate, said lifting mechanism including an outer tube attached to said support frame and an inner tube telescopically received within said outer tube;
   means for extending, retracting, and rotating said outer tube relative to said inner tube to move said support frame between a lowered position, perpendicular to a truck bed sidewall, and a raised position, parallel to the truck bed sidewall.

5. The toolbox lift according to claim 4 wherein said means for extending, retracting, and rotating said outer tube relative to said inner tube to move said support frame between the lowered position, perpendicular to the truck bed sidewall, and the raised position, parallel to the truck bed sidewall comprises:
   said outer tube having at least one guide roller on an inner surface;
   said inner tube having at least one slot that traverses a substantially vertical, circumferential path within a predetermined range, said guide roller riding within said slot;
   a hydraulic cylinder received within said inner tube and attached to said outer tube, whereby when said cylinder is extended or retracted the guide roller rides within said slot causing said outer tube and said frame to change elevation and rotate.

6. The toolbox lift according to claim 5 further comprising a switch for selectively extending and retracting said cylinder.

* * * * *